Patented Jan. 15, 1952

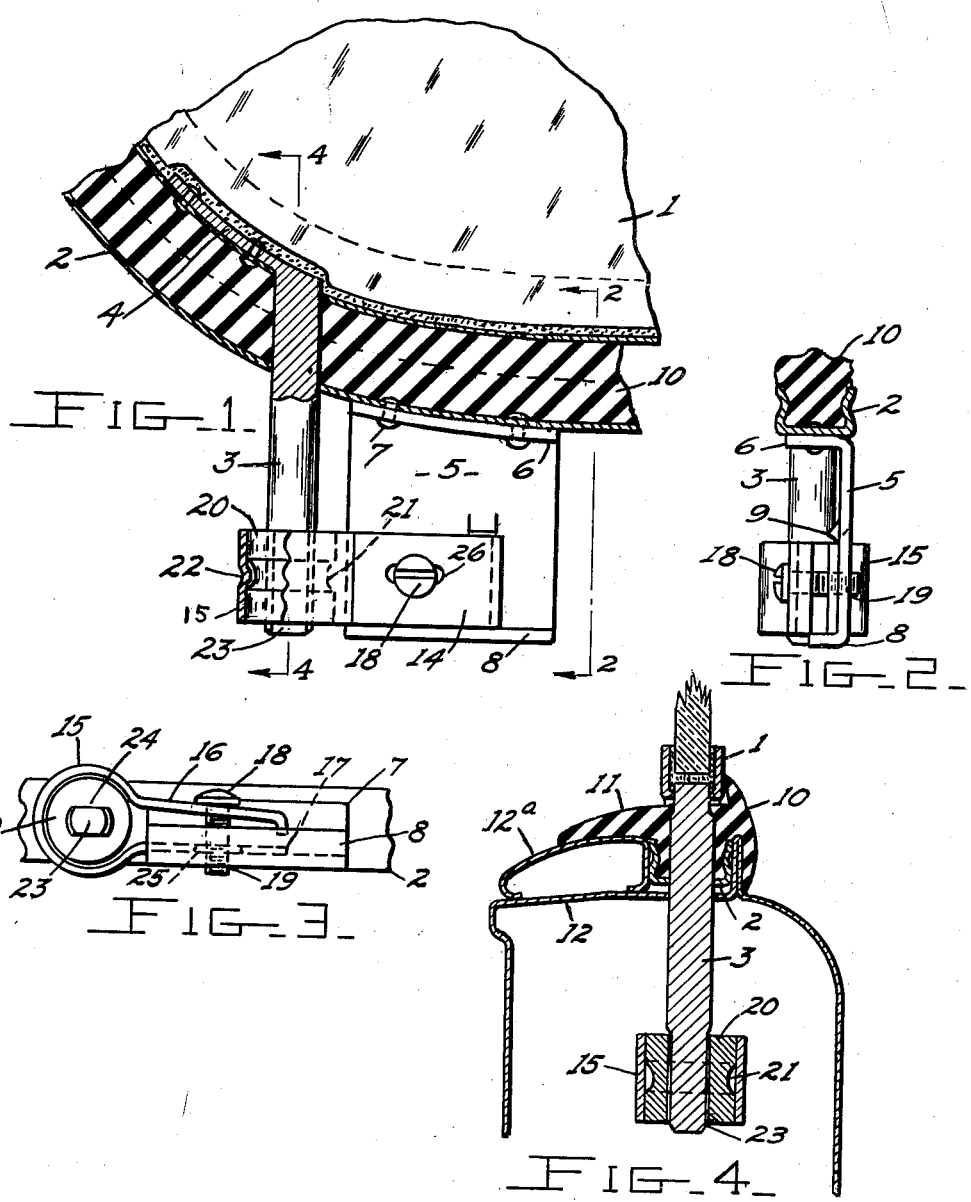

2,582,584

UNITED STATES PATENT OFFICE 2,582,584

FRICTION DEVICE FOR HOLDING WIND WINGS OPEN

Harvey D. Carbiener, Elkhart, Ind., assignor to Excel Corporation, Elkhart, Ind., a corporation of Indiana Application December 1, 1948, Serial No. 62,868

1 Claim. (Cl. 296—44)

This invention relates to ventilating windows or wind wings, such as are used in automotive vehicles and of the type wherein the wind wing is shiftable from closed position about an upright axis into different angular positions, and has for its object a spring tension device acting on the pivot pin when the wind wing is open into different angular positions to hold the wind wing in the angular position and from closing under the force of the outer air or wind pressures against the same.

The invention consists in the novel features and in the combinations and constructions hereinafter set forth and claimed.

In describing this invention, reference is had to the accompanying drawings in which like characters designate corresponding parts in all the views.

Figure 1 is an enlarged fragmentary elevation of the wind wing and the contiguous portion of the window frame and the pivot pin, the friction holding or braking means, and the support therefor.

Figure 2 is a sectional view on line 2—2, Figure 1, looking to the left in Figure 1.

Figure 3 is an inverted plan view looking upwardly in Figure 1.

Figure 4 is a section on line 4—4, Figure 1.

This invention comprises means supported from the frame in which the pivoted window or wind wing is mounted to apply a friction braking force to the hinge or pivot pin of the wind wing against rotation, the braking means being adjustable to create sufficient friction to hold the wind wing in various open positions against closing under outside wind or air pressure. The friction means, in the illustrated embodiment, also constitutes a friction journal bearing for the pivot pin.

1 designates the window or wind wing sash, and 2 the window frame. Wind wings are mounted in openings in the car body, or in the doors, particularly the doors at the ends of the front seat. Owing to the streamlined contour of the car body, the wind wings are usually triangular in form and located in the front portions of the window openings. The window openings also enclose a glass pane, not shown, in the rear of the wind wing capable of being raised and lowered, the front edge of the glass pane abutting against the rear edge of the wind wing when the wing and glass pane are closed. The window frame 2 follows the contour of the opening in the door or car body.

3 designates the pivot or hinge pin which is formed with a bracket 4 secured to the lower rail of the sash of the wind wing, toward but spaced from the front end thereof so that when the rear end of the wind wing is swung outwardly, the front end in front of the axis of the pivot pin swings inward.

5 designates a bracket in the form of a plate secured to the lower rail of the window frame 2 adjacent and at the rear of the pivot pin 3 and located in the plane of the pivot pin of the frame 2 and sash 1, the plate having an angular flange 6 secured at 7 to the bottom rail of the window frame 2, and also an angular flange 8 at its lower edge constituting a supporting shelf for the tension spring to be presently described. The bracket is also formed with a projecting shoulder 9 between its upper and lower edges, which shoulder is opposed to the flange 8 and coacts with the upper edge of the tension spring. The flange 8 and shoulder 9, together with a securing and clamping screw to be described, secures the spring to the bracket 5. The friction or brake means is thus supported from the window frame by the bracket.

The frame 2 is of conventional structure. It comprises a metal channel in which is seated a rubber finishing and weather strip 10. The frame extends entirely around the window opening. The strip 10 has a lip 11 overlying a metal finishing strip 12A secured to the upper edge wall 12 of the window opening door or car body, in the usual way. The weather strip 11 is so formed as to permit the portion of the wind wing in front of the pivot pin 3 to swing inward, and the portion at the rear of the pivot to swing outwardly from closed position. The wind wing structures are rights and lefts. That here shown is for installation on the right hand side of the car body.

14 designates the friction spring, this being in the form of a band 15 extending around the pivot pin and coacting with means thereon provided with a peripheral surface with which the inner face of the band coacts, the band having radially extending arms 16, 17, opposed to each other, the arms overlying the bracket 5 and one arm, as 17, resting on the flange 8 at its lower edge and coacting with the shoulder 9 at its upper edge. The spring is secured to the bracket as by a clamping screw 18 extending through openings in the arms 16, 17, and threading into a hole at 19 in the bracket 5, the screw serving not only to secure the spring to the bracket 5, but also to clamp the arms 16, 17, toward each other and thus apply the band 15 with different degrees of friction to the pin 3. The means on the pin 3, with which the band 15 coacts, is here shown as a plug 20 slidable on the lower end of the pivot pin 3 and formed with a peripheral surface with which the band coacts, and with a peripheral groove 21 for receiving one or more radial projections or embossments 22 on the band 15, the projections also holding the plug from axial displacement on the pivot pin 3. In order that the plug may be keyed to the pin 3 to rotate therewith, the pivot pin at its lower end is formed non-circular, as at 23, and the plug is formed with a complemental non-circular axial opening 24. The band frictionally coacts with the plug and provides a friction journal bearing for the pivot pin.

In assembling the wind wing in the frame, the pivot pin is passed through the opening in the frame 2, the plug encircled by the band slipped axially over the lower end of the pin 3, and then the spring secured to the bracket 5 by means of the screw 18.

In order that the spring may be adjusted relatively to the axis of the pin 3, one of the arms, as 17, of the spring is formed with an enlarged perforation 25, and the other or outer arm 16 with an elongated slot 26 of less width than the diameter of the head of the screw, the length of the slot and the diameter of the hole being such as to allow the spring band 15 to be concentric with the axis of the hinge pin 3, and the screw 18 to be in alinement with the threaded hole 19 in the bracket 5.

As is well known in wind wings that are operated manually by pushing against them to swing them on their pivots, the pivot bearings eventually become loose, so that the wind wings when opened will close under the outside wind or air pressure. By this construction, the tension can be adjusted by turning the screw 18. Preferably, a hole is left in the panel on the inside of the door, or car body, through which a tool can be inserted to turn the screw.

What I claim is:

A spring friction tension device for holding the windows of pivoted ventilating window constructions open at different angles, which window constructions comprise a sash, a frame and a pivot pin extending edgewise from the sash in the plane thereof through the frame; said device comprising a bracket in the form of a plate depending from the frame and secured at one edge thereto and located in the plane of the frame adjacent the pivot pin, a cylindrical plug on the pivot pin and secured thereto to rotate as a unit therewith, a friction spring band carried by the bracket and enclosing the plug in frictional contact therewith, the plug being formed with a circumferential groove, and the band being provided with an offset extending into the groove, and means for securing the band to the bracket and closing the same with more or less friction on the plug.

HARVEY D. CARBIENER.

REFERENCES CITED

The following references are of record in the file of this patent:

UNITED STATES PATENTS

| Number | Name | Date |
|---|---|---|
| 1,638,065 | Simon | Aug. 9, 1927 |
| 1,745,545 | Kast | Feb. 4, 1930 |
| 1,757,860 | Hall et al. | May 6, 1930 |
| 2,109,924 | Mackey | Mar. 1, 1938 |
| 2,260,403 | Preston | Oct. 28, 1941 |

FOREIGN PATENTS

| Number | Country | Date |
|---|---|---|
| 424,122 | Great Britain | Feb. 12, 1935 |